US009946787B2

(12) United States Patent
Bigini et al.

(10) Patent No.: US 9,946,787 B2
(45) Date of Patent: Apr. 17, 2018

(54) COMPUTERIZED SYSTEMS AND METHODS FOR GENERATING INTERACTIVE CLUSTER CHARTS OF HUMAN RESOURCES-RELATED DOCUMENTS

(71) Applicant: Comrise, Inc., Hazlet, NJ (US)

(72) Inventors: Robert J. Bigini, Basking Ridge, NJ (US); Sincia Liu, Hazlet, NJ (US); Gregory Shevach, Hurley, NY (US)

(73) Assignee: COMRISE, INC., Hazlet, NJ (US)

( * ) Notice: Subject to any disclaimer, the term of this patent is extended or adjusted under 35 U.S.C. 154(b) by 0 days.

(21) Appl. No.: 15/172,919

(22) Filed: Jun. 3, 2016

(65) Prior Publication Data
US 2016/0364693 A1 Dec. 15, 2016

Related U.S. Application Data

(63) Continuation of application No. 14/738,447, filed on Jun. 12, 2015.

(51) Int. Cl.
*G06F 17/30* (2006.01)
*G06Q 10/10* (2012.01)
(Continued)

(52) U.S. Cl.
CPC .. *G06F 17/30684* (2013.01); *G06F 17/30713* (2013.01); *G06Q 10/1053* (2013.01)

(58) Field of Classification Search
CPC combination set(s) only.
See application file for complete search history.

(56) References Cited

U.S. PATENT DOCUMENTS 6,751,614 B1 6/2004 Rao
6,922,699 B2 7/2005 Schuetze et al.
(Continued)

OTHER PUBLICATIONS

Swapnil Sonar et al., "Resume Parsing with Named Entity Clustering Algorithm", paper, SVPM College of Engineering Baramati, Maharashtra, India, 6 pages.
(Continued)

*Primary Examiner* — Mark A Fleischer
(74) *Attorney, Agent, or Firm* — K&L Gates LLP

(57) ABSTRACT

Computer systems and methods generate a cluster chart for HR-related documents. A host computer data center comprises a database for electronically storing HR-related documents, a web server, and a programmable computer device. The programmable computer device is programmed to determine clusters of prevalent terms in a collection of HR-related documents in the database. The collection of HR-related documents from which the clusters are generated is identified based on search criteria submitted from a client computer device. The clusters of prevalent terms in the collection can be determined using a clustering algorithm employing algebraic transformations of a term-document matrix generated from the collection of HR-related documents. The programmable computer device is also programmed to assign each of the HR-related documents in the collection to one or more of the determined clusters, and to generate a chart graphically showing the clusters. Each cluster in the chart has a characteristic (e.g., size) that is related to the quantity of the HR-related documents assigned to the cluster. A web server serves the chart in a cluster chart web page to the client computer device. The cluster chart web page comprises a document listing field. Each cluster in the cluster chart web page comprises a hyperlink that when activated from the client computer device, to thereby select
(Continued)

a cluster, causes the document listing field to list the HR-related documents assigned to the selected cluster.

15 Claims, 11 Drawing Sheets

(51) Int. Cl.
*G06F 17/27* (2006.01)
*G06F 17/16* (2006.01)

(56) References Cited

U.S. PATENT DOCUMENTS

| | | | |
|---|---|---|---|
| 6,941,321 B2 | 9/2005 | Schuetze et al. | |
| 7,844,566 B2 | 11/2010 | Wnek | |
| 8,352,465 B1* | 1/2013 | Jing | G06F 17/30867 |
| | | | 707/723 |
| 8,805,845 B1 | 8/2014 | Li et al. | |
| 8,818,910 B1 | 8/2014 | Liu et al. | |
| 2003/0061242 A1* | 3/2003 | Warmer | G06F 17/30707 |
| 2009/0094233 A1 | 4/2009 | Marvit et al. | |
| 2011/0295759 A1* | 12/2011 | Selvakummar | G06Q 10/063112 |
| | | | 705/321 |
| 2013/0187926 A1* | 7/2013 | Silverstein | G06Q 10/105 |
| | | | 345/440 |
| 2014/0079297 A1* | 3/2014 | Tadayon | G06K 9/00 |
| | | | 382/118 |
| 2015/0302084 A1* | 10/2015 | Stewart | G06F 17/30705 |
| | | | 707/776 |
| 2016/0012126 A1* | 1/2016 | Franceschini | G06F 17/30628 |
| | | | 707/735 |

OTHER PUBLICATIONS

Stanislaw Osinski et al. "Lingo: Search Results Clustering Algorithm Based on Singular Value Decomposition", Institute of Computing Science, Poznan University of Technology, ul. Piotrowo 3A, 60-965 Poznan, Poland, 10 pages.

* cited by examiner

COMPUTERIZED SYSTEMS AND METHODS FOR GENERATING INTERACTIVE CLUSTER CHARTS OF HUMAN RESOURCES-RELATED DOCUMENTS

PRIORITY CLAIM

The present application claims priority as a continuation to U.S. nonprovisional patent application Ser. No. 14/738,447, filed Jun. 12, 2015, which is incorporated herein by reference in its entirety.

BACKGROUND

Sometimes it can be chaotic for a firm to find the right candidate to hire for an open job position because the firm may have hundreds, thousands, or even hundreds of thousands of candidates that are available in the firm's resource/resume database. Some order can be brought to this chaos by scoring the job applicants based on skill set match. Such scores currently are typically computed based on the number of times keywords related to the position appear in the candidates' resumes. For example, if a firm is looking to hire a JAVA programmer, the candidates could be scored based on the number of times "JAVA" appears in their resumes. While useful, such scoring algorithms, however, do not provide the firm with an intuitive view of the breadth of skills of the applicants because they are narrowly focused on the entered keyword. Further, ranking candidates by keywords can mask other, more qualified candidates that do not use the keyword as prominently.

SUMMARY

In one general aspect, the present invention is directed to particular computer systems and methods that cluster human resources (HR)-related documents based on prevalent terms in those documents using a clustering algorithm. The clustering algorithm employs algebraic transformations of a term-document matrix generated from the collection of HR-related documents. The HR-related documents can be resumes or descriptions for job postings by employers, for example. The HR-related documents are assigned to the identified clusters and then an interactive chart for a web page is generated, where the determined clusters are represented in the chart. The chart may comprise, for example, a two-dimensional space in which the clusters are represented by two-dimensional icons in the space, such as nonoverlapping polygonal shapes. Moreover, the area (or size) of the icons (e.g., polygonal shapes), or some other characteristic, can be related to the quantity of HR-related documents assigned to the clusters represented by the respective icons. Additionally, each cluster in the chart can have an associated hyperlink, such that when a user selects one of the clusters, a listing of the HR-related documents assigned to the cluster is shown on the web page.

Using this invention, a user can readily visualize the prevalent phrases in the collection of resumes or job descriptions, as the case may be, and quickly access the documents associated with each cluster. These and other benefits of the present invention will be apparent from the following description.

FIGURES

Various embodiments of the present invention are described herein by way of example in connection with the following figures, wherein.

DESCRIPTION

Figure 1:
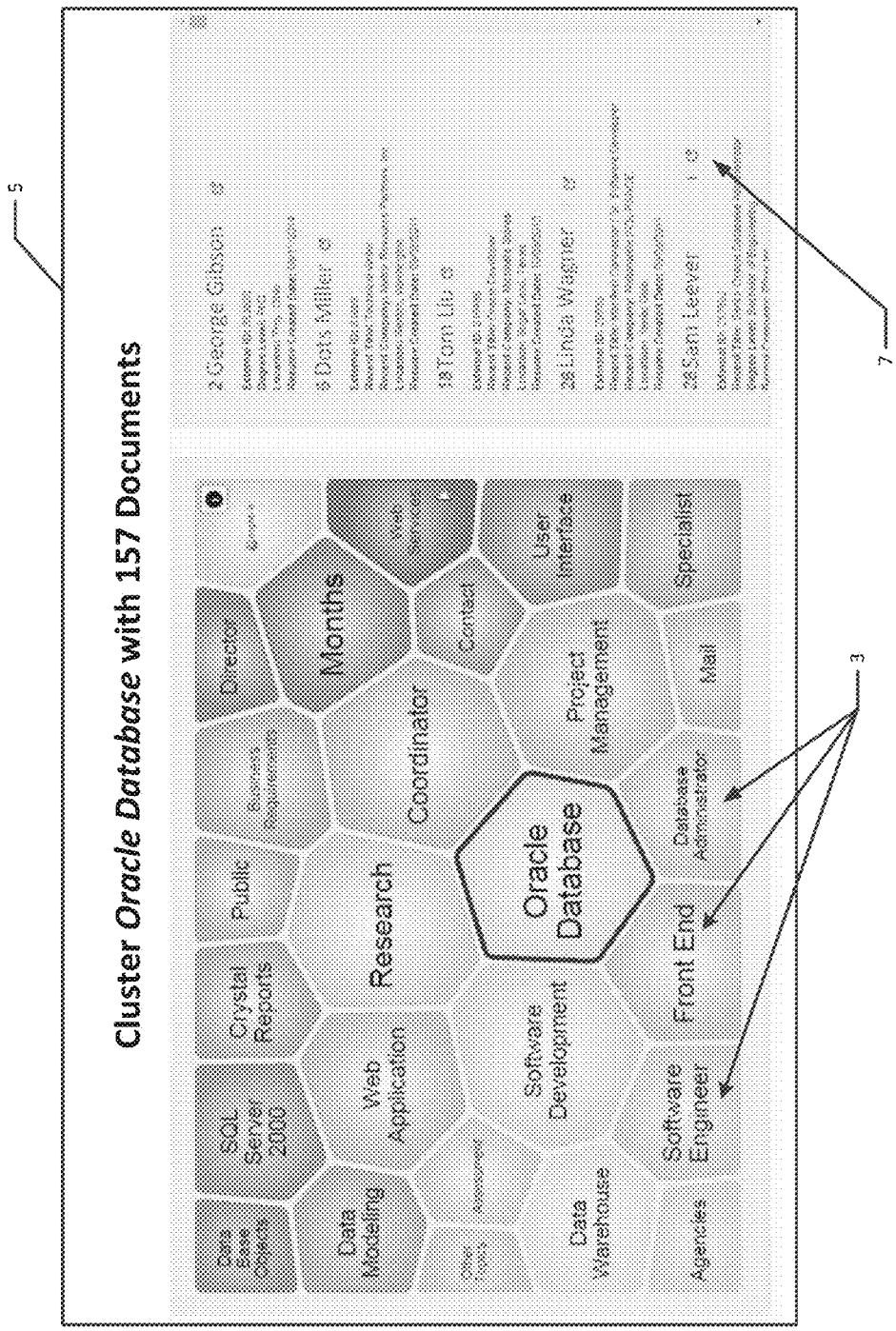
FIGS. 1, 6 and 8 illustrate web pages with cluster charts that cluster prevalent terms in HR-related documents according to various embodiments of the present invention.

In one general aspect, the present invention is directed to computer-based systems and methods that determine clusters of prevalent terms and phrases in human resources (HR)-related documents, such as resumes or job descriptions, and then sorts those documents into the determined clusters (recognizing that a document could be placed into multiple clusters as explained below). A web page with a chart (preferably interactive) showing the clusters, an example of which is shown in FIG. 1, can then be created and served to a remote client, who can view it in a software application suitable for rendering the web page, such as a web browser or a mobile app. In the example of FIG. 1, described in more detail below, the clusters 3 correspond to prevalent phrases and terms in a collection of resumes that are in a computer database and that include the keyword "database developer." This example cluster chart 5 was generated by searching the resume database for resumes having the term "database developer"; determining the clusters based on the resumes that contained the keyword ("the search results") using a clustering algorithm; associating each of the search results with one or more of the clusters using a sorting algorithm; and then generating the chart. In the chart 5, the sizes of clusters 3 can correspond to (e.g., be linearly proportional to) the number of documents associated with that cluster. For instance, in this example, there are more resumes associated with the "Oracle Database" cluster than the "Agencies" cluster (in the lower left corner) as indicated by the size difference between the icons for "Oracle Database" cluster and the "Agencies" cluster. Also, the user can select a cluster in the interactive chart, such as by clicking (or double clicking) on the icon associated with the user's desired cluster, to view a listing of the documents associated with the selected cluster in a document listing field 7, which is to the right of the chart 5 in the example of FIG. 1. In the illustrated example, the user selected the "Oracle Database" cluster. The user could also select multiple clusters at once, disjunctively or conjunctively, with the field 7 listing the documents associated with the selected clusters. As one implementation example, the user could select multiple clusters conjunctively by holding down the "Ctrl" key on the keyboard when selecting the clusters, and could select multiple clusters disjunctively by holding down the "Atl" key when selecting the clusters. In addition, in various embodiments, the user can select (e.g., click on or hover over) one of the documents in the listing field 7 for the selected document to appear in a separate window or tab of the software application.

Figure 2:
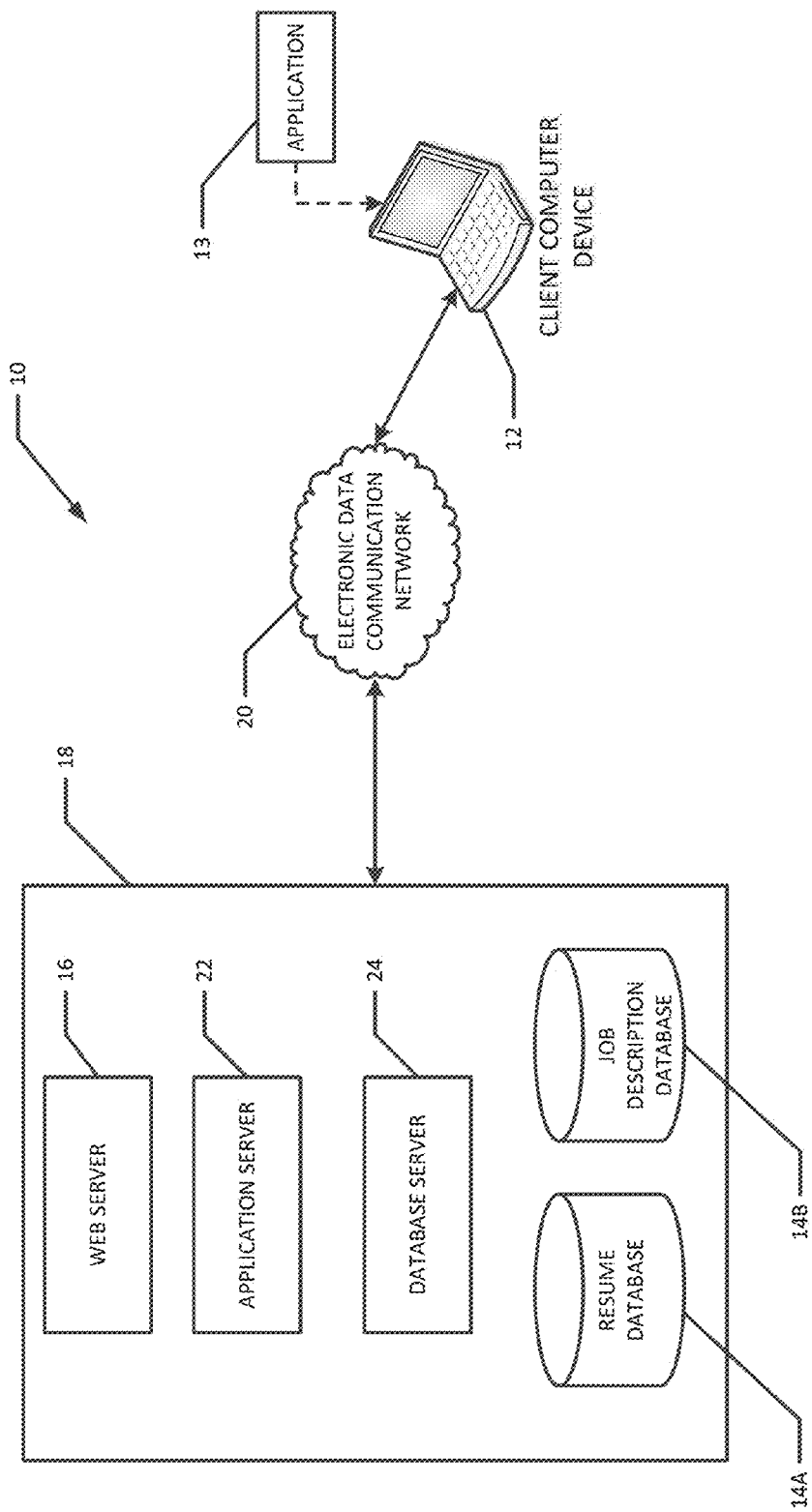
FIG. 2 is a block diagram of a computer system for generating the cluster chart web pages according to various embodiments of the present invention.

FIG. 2 is a simplified block diagram of an exemplary computer-based system 10 used to generate such charts 5 according to various embodiments of the present invention. In the illustrated example, a host data center 18 generates the charts and serves them in web pages via an electronic data communication network 20 to a client computer device 12 (sometimes referred to herein as "client 12"). The client computer device 12 comprises the software application 13 for rendering the web page with the chart for the user, such as a web browser, a mobile app, or any other suitable software application for displaying the web page on the client 12. In that connection, the client computer device 12 may be a personal computer, a laptop, a tablet, a smartphone, a wearable computer, or any other suitable processor-based computer device with a display.

As shown in FIG. 2, the host data center 18 can include a web server 16, an application server 22, and a database server 24. The servers 16, 22, 24 are all connected via a computer network. The web server 16 can serve the files that form the web pages described herein to the client 12 via the network 20, and the client 12 can transmit its HTTP requests from the software application 13 to the web server 16. In various embodiments, the application server 22 executes software to determine the clusters for the HR-related documents that satisfy the search criteria, to sort the documents into the clusters, and to generate the chart, as described herein. The database server 24 manages the databases of the host data center 18. The host data center's databases can store the HR-related documents, including a resume database 14A that stores (in a searchable format) resume data for prospective job candidates and a job descriptions database 14B that stores (in a searchable format) job description data for various job and consultancy openings or postings. The HR-related documents from which the cluster charts are generated could also include assessments, performance reviews, and application forms, or any other suitable HR-related documents. The description that follows assumes that the HR-related documents are resumes and job descriptions, but these are examples of suitable HR-related documents for the sake of explanation, and it should be recognized that the invention is not so limited. The resume database 14A (or some other database) can also store other (meta) data about the job applicants (e.g., the persons who have resumes in the resume database). This metadata can include data about the job applicants that is not included in their resume per se (e.g., a timestamp for when their resume was added to the database) that can be used to search for the resumes satisfying the search criteria. The electronic data communication network 20 is preferably an IP network, such as the Internet, an intranet, an extranet, etc. The network 20 could also use other types of communication protocols, such as Ethernet, ATM, etc., and could include wired and/or wireless links. A "web server" as used herein is any computer server device that handles the HTTP protocol to serve such web pages to an end user device (e.g., the client 12).

Figure 3:
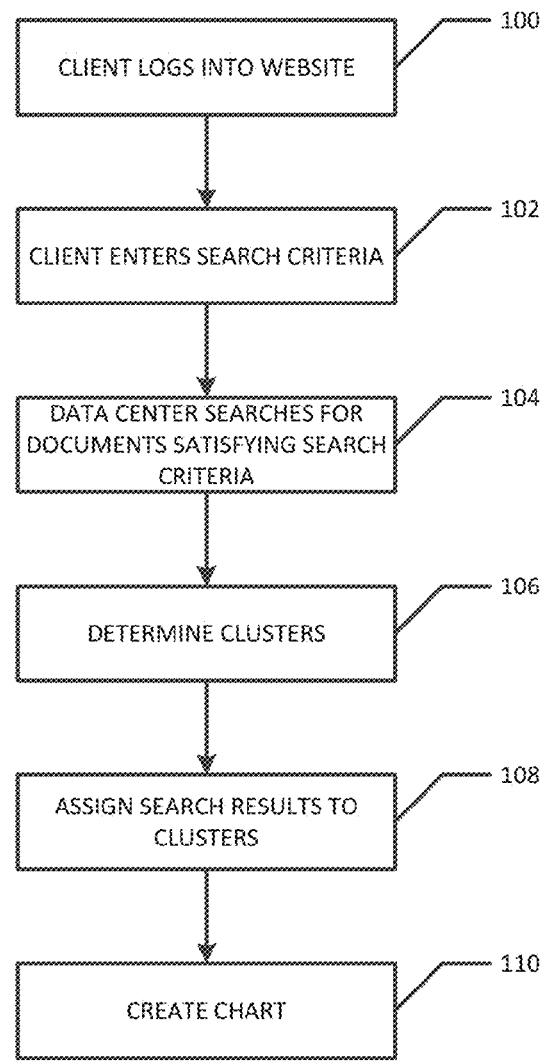
FIG. 3 is a flow chart of a process flow executed by the computer system of FIG. 2 to generate the cluster chart web pages according to various embodiments of the present invention.
Figure 4:
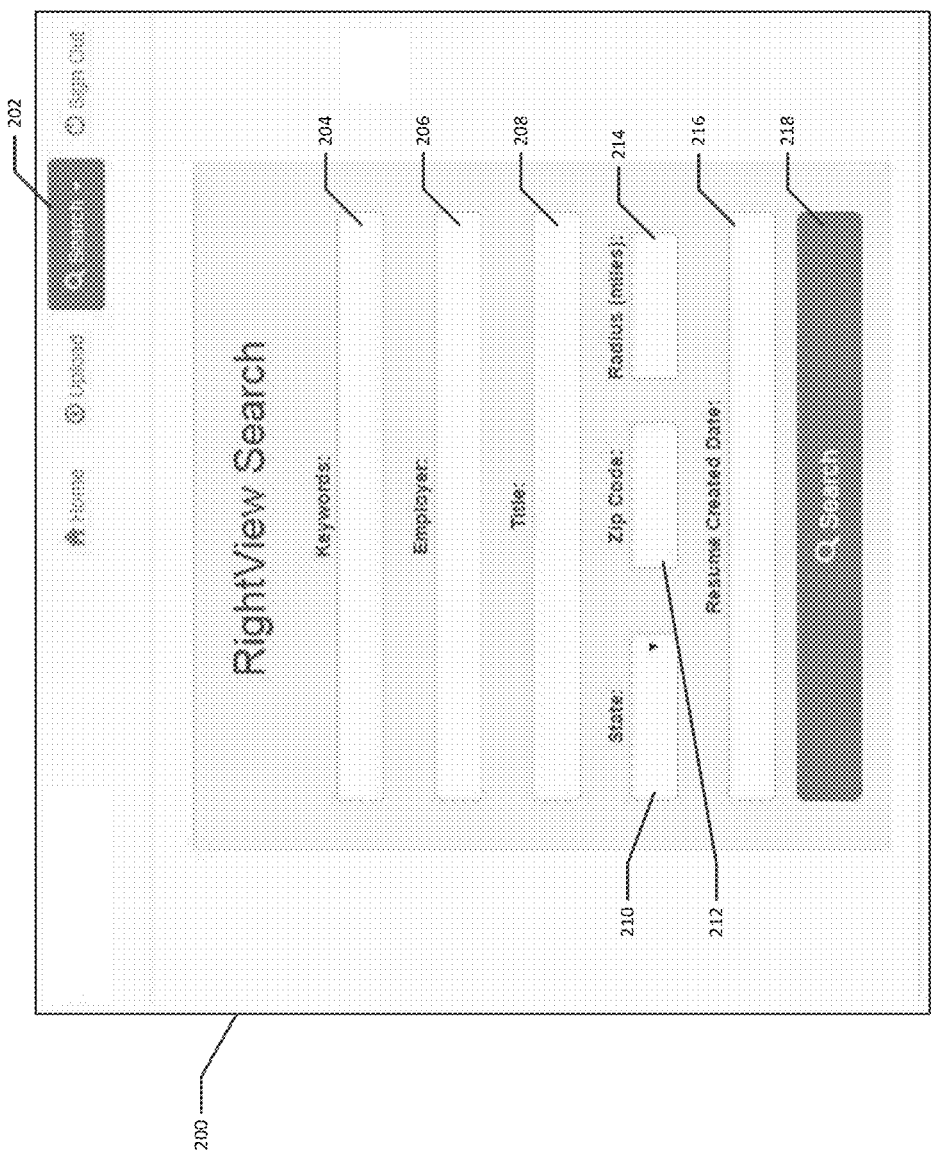
FIGS. 4, 5 and 7 illustrate web pages through which a user can input search criteria for cluster charts according to various embodiments of the present invention.

FIG. 3 is a flow chart of a process flow executed by the host data center 18 according to various embodiments of the present invention. In the example of FIG. 3, the user (at the client 12) is reviewing resumes of possible job candidates. At step 100, the client 12 logs into the web site or opens the mobile app hosted by the data center 18 and selects to search the resume database 14A. FIG. 4 is an example of a web page 200 served by the web server 16 to the client 12 through which the client can enter the applicable search criteria. The user could select the option of searching the resume database through the "Search" button 202 that, when selected, provides a drop-down menu of available databases to search (e.g., resumes, job descriptions, etc.).

Next, at step 102, the client 12 can enter the search criteria. As shown in FIG. 4, the client 12 can enter search criteria for the job candidates whose resumes are in the resume database 14A through one or a number of search parameters, including for example: keywords entered in a keyword search field 204; present or past employers of the candidates entered in an employer search field 206; present or past job titles of the candidates entered in a job title search field 208; the candidates' state of residence entered in a state search field 210; geographical proximity by entering a zip code and a radius therefrom in the zip code and radius search fields 212, 214; and/or the candidates' resume creation date entered in the date field 216. In other embodiments, other search parameters could be used. The resumes in the resume database 14A are preferably parsed to facilitate searching of them based on the input search criteria. And as mentioned before, some of the relevant data for the job applicants may be stored in a job applicant tracking system, which could be part of the resume database 14A or some other database of the data center 18.

The search terms can be delimited by quotes. In various embodiments, the user can use Boolean operators (e.g., AND or OR) for multiple search terms in one search field. When "AND" is used to join multiple entered keywords, the data center 18 searches only for resumes (or other HR-related documents as the case may be) that contain each of the entered keywords. If "OR" is used, the data center 18 searches for resumes (or other HR-related documents as the case may be) that contain any of the entered keywords. In various embodiments, it is assumed that Boolean AND is used when the user enters search criteria in multiple search fields 204-216.

Figure 5:
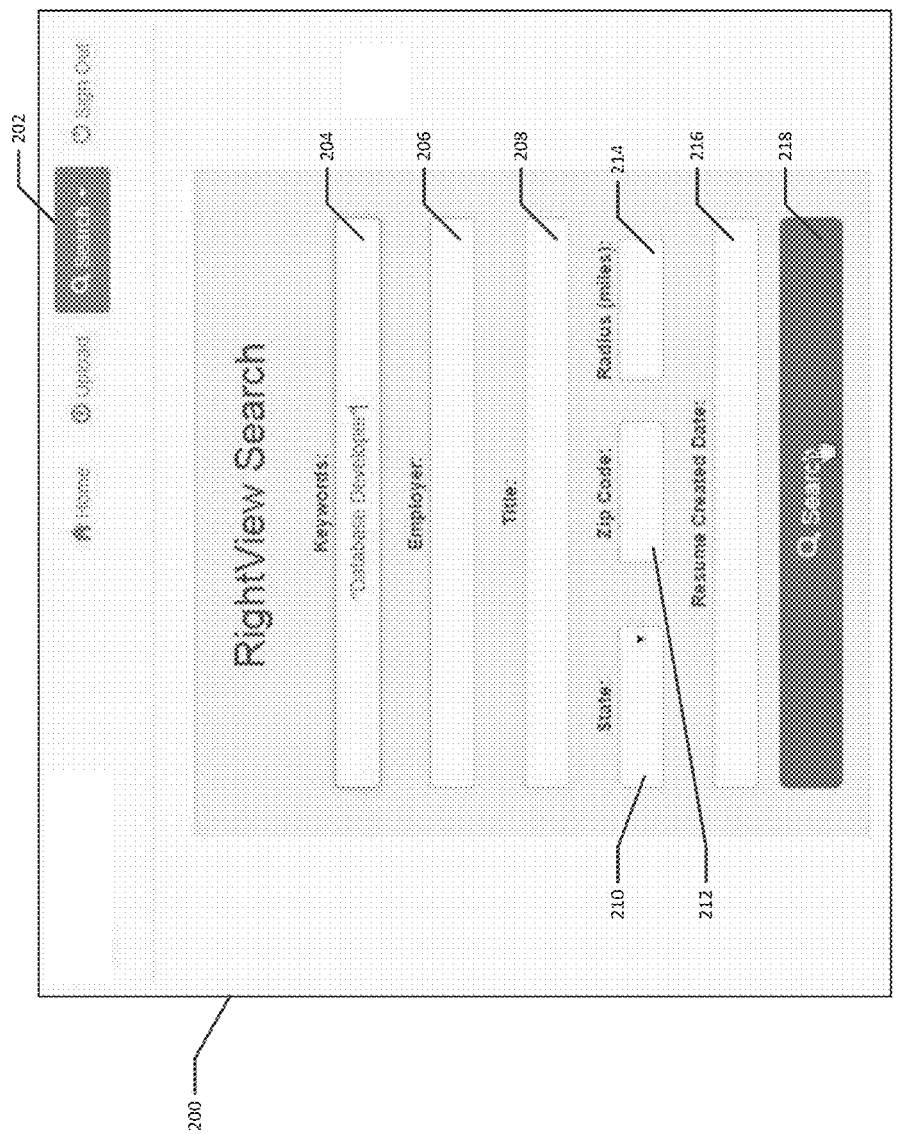

FIG. 5 is an example where the client 12 entered "Database Developer" in the keyword search field 204 as the search criteria. When the client 12 clicks the "Search" command button 218, the web server 16 receives the request from the client 12 and at step 104 (see FIG. 3) the data center 18 (via the database server 24) searches the relevant database for documents in the database that satisfy the search criteria input by the client 12. In this example, the database server 24 searches for resumes in the resume database 14A that include the term "Database developer" ("the search results").

At step 106 of FIG. 3, the data center 18 (e.g., the applications server 22) determines the clusters of prevalent phrases and terms in the search results using a clustering algorithm. The clustering algorithm can employ a Vector Space Model (VSM) and linear algebra operations to determine the clusters. Also, latent semantic indexing and singular value decomposition can be used to ignore noisy or synonymous words. More details about such a clustering algorithm are described in S. Oshiski et al., "Lingo: Search Results Clustering Algorithm Based on Singular Value Decomposition," Advances in Soft Computing, Intelligent Information Processing and Web Mining, Proceedings of the International IIS: IIPWM'04 Conference, Zakopane, Poland, 2004, pp. 359-368 (referred to herein as "the Lingo paper"), which is incorporated herein by reference in its entirety.

According to such an exemplary clustering algorithm, a candidate for a cluster label must satisfy certain criteria, such as: (1) appear in the input documents at least certain number of times (term frequency threshold); (2) not cross sentence boundaries; (3) be a complete phrase; and (4) not begin nor end with a stop word. Once frequent phrases (and single frequent terms) that exceed term frequency thresholds are known, they are used for cluster label induction, which can involve three general steps: (i) term-document matrix building, (ii) abstract concept discovery, and (iii) phrase matching and label pruning, which are described in the Lingo paper.

The application server 22 can construct the term-document matrix out of single terms that exceed a predefined term frequency threshold. The weight of each term can be calculated using the standard term frequency, inverse document frequency (tfidj) formula, with terms appearing in document titles additionally being scaled by a constant factor. In abstract concept discovery, the Singular Value Decomposition method can be applied to the term-document matrix to find its orthogonal basis. Vectors of this basis (SVD's U matrix) supposedly represent the abstract concepts appearing in the input documents. In various embodiments, only the first k vectors of matrix U are used in the further phases of the algorithm. The value of k can be estimated by selecting the Frobenius norms of the term-document matrix A and its k-rank approximation $A_k$. Assuming threshold q is a percentage-expressed value that determines to what extent the k-rank approximation should retain the original information in matrix A, then k can be defined as the minimum value that satisfies the following condition: $\|A_k\|_F/\|A\|_F \geq q$, where $\|X\|_F$ denotes the Frobenius norm of matrix X. Clearly, the larger the value of q the more cluster candidates will be induced and it can be a preprogrammed threshold.

The phrase matching and label pruning step, where group descriptions are discovered, relies on an important observation that both abstract concepts and frequent phrases are expressed in the same vector space—the column space of the original term-document matrix A. Thus, the classic cosine distance can be used to calculate how "close" a phrase or a single term is to an abstract concept. Assuming a matrix P of size $t \times (p+t)$, where t is the number of frequent terms and p is the number of frequent phrases, then P can be easily built by treating phrases and keywords as pseudo-documents and using one of the term weighting schemes. Having the P matrix and the i-th column vector of the SVD's U matrix, a vector $m_i$ of cosines of the angles between the i-th abstract concept vector and the phrase vectors can be calculated: $m_i = U_i^T P$. The phrase that corresponds to the maximum component of the $m_i$ vector should be selected as the human-readable description of i-th abstract concept. Additionally, the value of the cosine becomes the score of the cluster label candidate. A similar process for a single abstract concept can be extended to the entire $U_k$ matrix—a single matrix multiplication $M = U_k^T P$ yields the result for all pairs of abstract concepts and frequent phrases.

An objective of the clustering algorithm is to generalize information from separate documents, while making it as narrow as possible at the cluster description level. Thus, the final step of label induction can be to prune overlapping label descriptions. Let V be a vector of cluster label candidates and their scores. Another term-document matrix Z can be created, where cluster label candidates serve as documents. After column length normalization, $Z^T Z$ can be calculated, which yields a matrix of similarities between cluster labels. For each row, columns that exceed a predefined label similarity threshold are selected and all cluster label candidates are discarded except the one with the maximum score.

Referring again to FIG. 3, once the clusters are determined, next, at step 108, the documents satisfying the search criteria (the search results) are assigned to each of the clusters using a sorting algorithm. The Lingo paper describes one suitable sorting algorithm. The classic Vector Space Model can be used to assign the search results to the cluster labels induced at step 106. Each search result can be re-queried with all induced cluster labels. The assignment process resembles document retrieval based on the VSM model. If Q is a matrix in which each cluster label is represented as a column vector, let $C = Q^T A$, where A is the original term-document matrix for input documents. This way, element $c_{ij}$ of the C matrix indicates the strength of membership of the j-th document to the i-th cluster. A document is added to a cluster if $c_{ij}$ exceeds a predefined assignment threshold. Consequently, a document can be assigned to multiple clusters. Documents not assigned to any cluster can be assigned to a catchall cluster such as "Other Topics," as shown in FIG. 1.

In various embodiments, there could also be a maximum cluster size or threshold. For example, if a cluster was assigned more than X % of the search results (or Y % of the total document assignments since documents can be assigned to multiple clusters), that cluster could be eliminated and steps 104 and 106 could be repeated (without using the eliminated cluster). There can also be a minimum cluster size. If a cluster has too few documents relative to a minimum cluster size threshold, the documents in those clusters can be assigned to the "Other Topics" cluster. Similarly, if there are too many clusters for the chart relative to a maximum cluster count threshold, the documents in the smallest clusters, up to the threshold, can be assigned to the "Other Topics" cluster. In that connection, there could also be a minimum cluster count. If the number of determined cluster is less than the minimum cluster count, the largest cluster can be eliminated and steps 104 and 106 repeated without using the label for the eliminated cluster.

Next, at step 110, the cluster chart 5 can be generated. In various embodiments, as shown in FIG. 1, the clusters determined at step 106 can be represented by icons, such as nonoverlapping geometric shapes, preferably polygons, like in a Voronoi diagram. In such an embodiment, the size of the clusters, icons can be related to the number of documents assigned to the cluster; for example, the sizes of the clusters can be linearly proportional to the number of the documents assigned to the cluster. In one embodiment, the largest clusters can be grouped in the middle of the chart, with the other clusters around the periphery, such as in the example of FIG. 1. In other embodiments, the cluster can decrease in size from left to right or right to left, or the clusters can be randomly positioned in the chart. Also, the clusters can have different colors to make them more visually distinguishable, although the cluster color need not indicate any other significance.

In other embodiments, different chart types may be used. For example, a bar chart could be used, where each cluster corresponds to a bar in the chart, and the height of the bar corresponds to the number of documents assigned to the cluster. Also, a pie chart could be used, where each cluster corresponds to a slice of the pie in the chart, and the size of the slice corresponds to the number of documents assigned to the cluster.

The chart, no matter its type, can be served as a web page to the client 12. As used herein, "web page" refers to a document viewable (or renderable) by a web browser or a mobile app (such as for a smartphone or tablet) written in HTML or other suitable markup language. Further, the cluster chart web page is preferably interactive. For example, each cluster can have an associated hyperlink. When the client 12 activates the hyperlink (such as by clicking on or hovering over a cluster), the listing of the documents assigned to that cluster can be shown in the document listing field 7. In the case of a resume search, the title of the documents may be the job candidates' names; and the field 7 can show additional information about the document, such as in the example of FIG. 1, which shows an ID, a recent job title, a degree level and a resume creation date for each job candidate.

Figure 7:
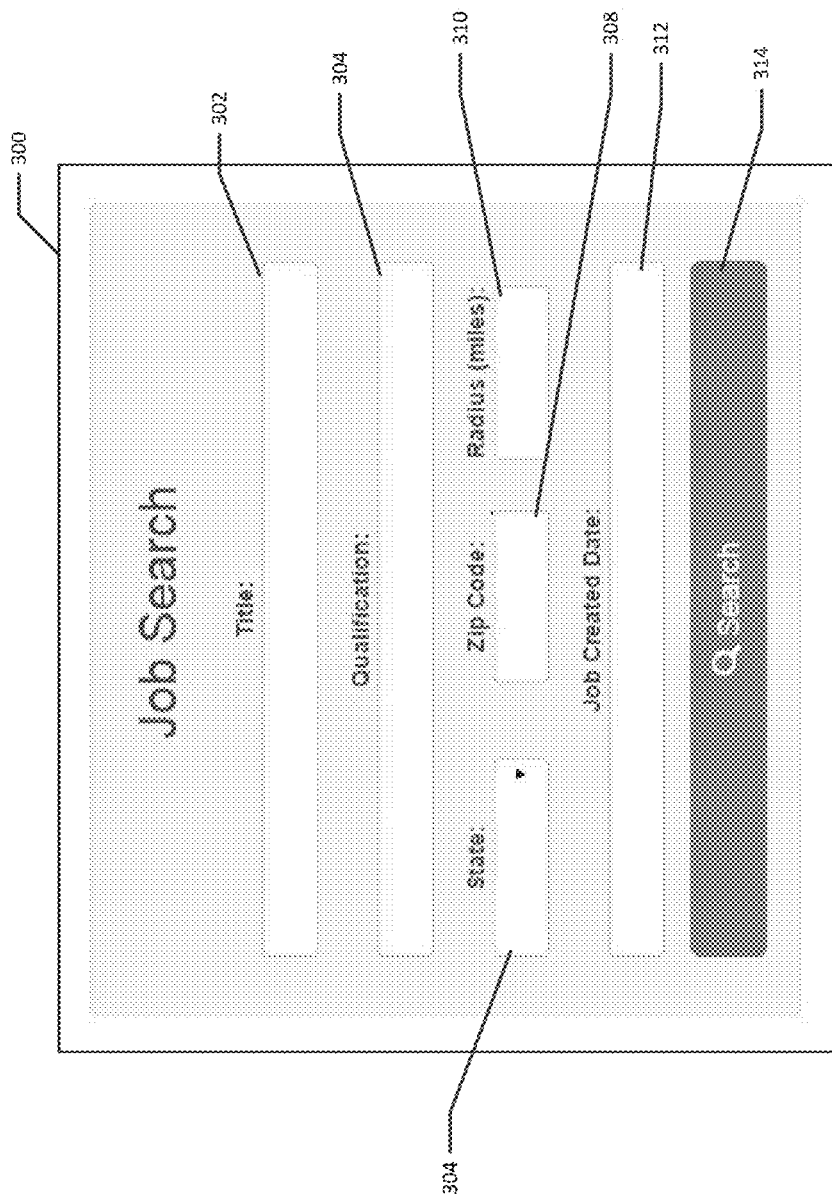
Figure 8:
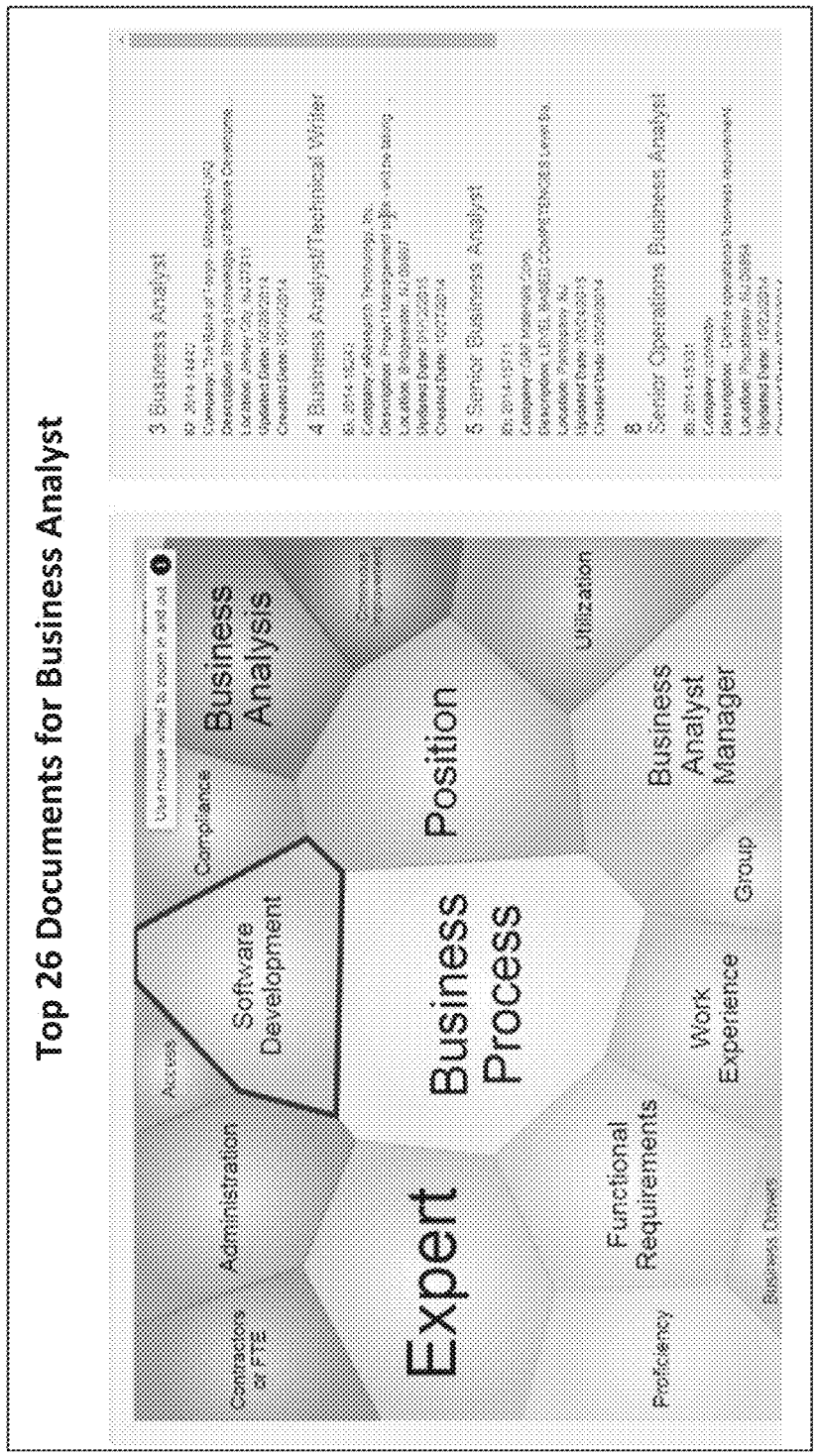

As mentioned previously, the system 10 could use be used to search for and cluster other types of HR-related documents besides resumes, such as job descriptions. FIGS. 7 and 8 illustrate such an example. FIG. 7 illustrates an example web page 300 that a user, at the client 12, may view to enter the search criteria for searching job descriptions in the job descriptions database 14B. As shown in FIG. 7, the web page 300 may include several fields in which the user can enter value for one or more search parameters. For example, the user can enter search: by job title by entering keywords in the job title field 302; by job qualifications by entering keyword in the job qualification field 304; by geographic location of the job by entering a state in the state field 306 and/or entering a zip code and radius in the zip code and radius fields 308, 310; or by job description creation date (the date the job description was added to the jobs database 14B) by entering a date in the job creation date field 312. In other embodiments, other search parameters could be used. The job descriptions in the job description database 14B are preferably parsed to facilitate searching of them based on the input search criteria. The search terms can be delimited by quotes. In various embodiments, the user can use Boolean operators as described above for multiple search terms.

Once the user enters the desired search criteria, the user can activate the "Search" button 314 to initiate the search. As before with the resume search, upon receiving the search request from the client 12, the database manager 24 searches for documents in the job description database 14B for job descriptions that satisfy the search criteria; and then the application server 22 generates the clusters for the prevalent words and phrases in those documents, assigns the documents in the search results to the determined clusters, and generates the cluster chart, an example of which is shown in FIG. 8, which shows an example cluster chart for job descriptions having the keyword "Business Analyst" in the job title. As with the resume cluster chart (see FIG. 1), when the user selects one (or more) of the clusters, the documents (in this case, job descriptions) assigned to the selected cluster(s) are listed in the field 7. Each listed job description could include additional relevant data, such as job description ID; company placing the job description; the job description; the location for the job; and relevant dates for the job description, as shown in the example of FIG. 8.

The user at the client 12 can select multiple clusters in the cluster map at once. In a disjunctive selection mode, any document that is in one of the selected clusters is listed in the field 7. In a conjunction selection mode, only documents that are in each of the selected clusters are display in the field 7. The display may include text that indicates the number of documents in the selected cluster(s). For example, the display in FIG. 1 states, "Cluster Oracle Database with 157 Documents," indicating that 157 resumes were assigned to the Oracle Database cluster in this example. The text can change dynamically as the user moves his/her cursor over the chart to show the number of documents assigned to the cluster that the user is currently hovering over with his/her cluster. When no clusters are selected, the display may include text that indicates the total number of documents represented by the chart, as shown in example of FIG. 8, which shows the total number of job descriptions (26) satisfying the search criteria.

In one embodiment, the chart may represent all of the documents that satisfy the search criteria. In other embodiments, a scoring algorithm may be used to limit the number of documents included in the chart. For example, the documents can be scored and ranked—highest to lowest—according to the scoring algorithm, with documents only up to the top N scores (e.g., top 500) or the top P % of scores (e.g., top 75%) being included in the chart. The scoring algorithm may be a relevance scoring algorithm that scores each document relative to the search criteria (e.g., documents that use the search criteria more often are scored higher). In other embodiments, different scoring algorithms could be used. For example, in another embodiment, resumes that satisfy the search criteria can be scored according to a prioritization algorithm, such as described in U.S. Pat. No. 8,818,910, which is assigned to Comrise, Inc., and incorporated herein by reference in its entirety. This incorporated patent describes using a Random Forest Algorithm to prioritize job candidates based on their probability of being the right fir for an opening.

Figure 6:
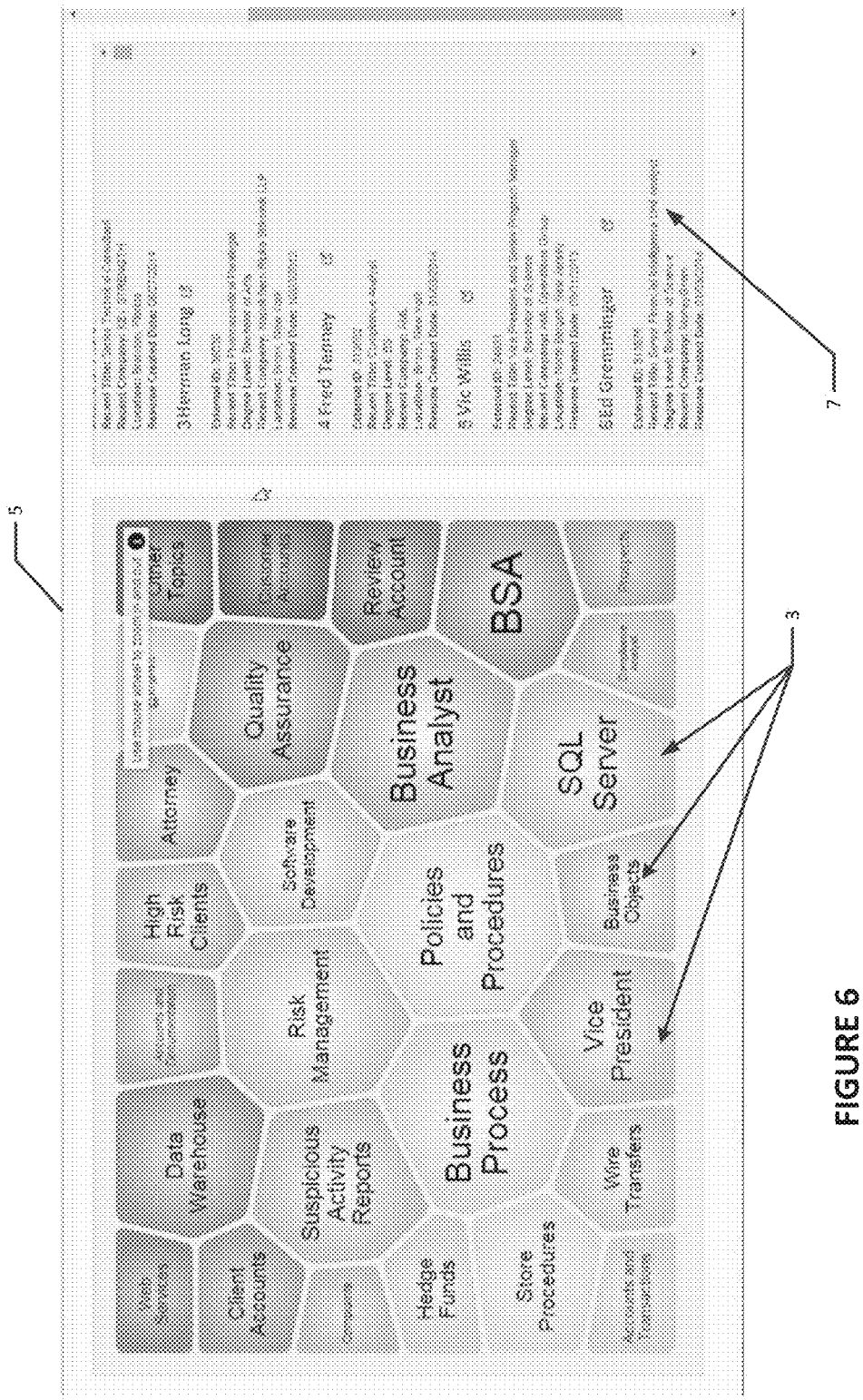

The cluster chart, particularly a resume cluster chart, can be used by a hiring firm to determine, for example, the areas of strength and weakness in a pool of job candidates. For example, the example of FIG. 1 shows many job candidates familiar with Oracle and SQL databases, but other database management systems do not appear in the chart. The chart could also be used for educational purposes, particularly by recruiters. For example, if a recruiter is not familiar with the job attributes in a particular field, it can enter keywords associated with that field in the keyword search field 204 (see FIG. 4) and analyze the resulting clusters to become more familiar with the terms used in that particular field. For instance, FIG. 6 illustrates a cluster chart for resumes including the keyword "Anti-Money Laundering." This chart shows the key concepts a recruiter should be familiar with when recruiting a candidate in this field includes BSA (Bank Security Act), etc. Similarly, a job applicant could search the job descriptions to determine the prevalent keywords associated with particular job openings and/or employers.

Figure 9A:
FIGS. 9A-9C illustrate tiered cluster charts according to various embodiments of the present invention.
Figure 9B:
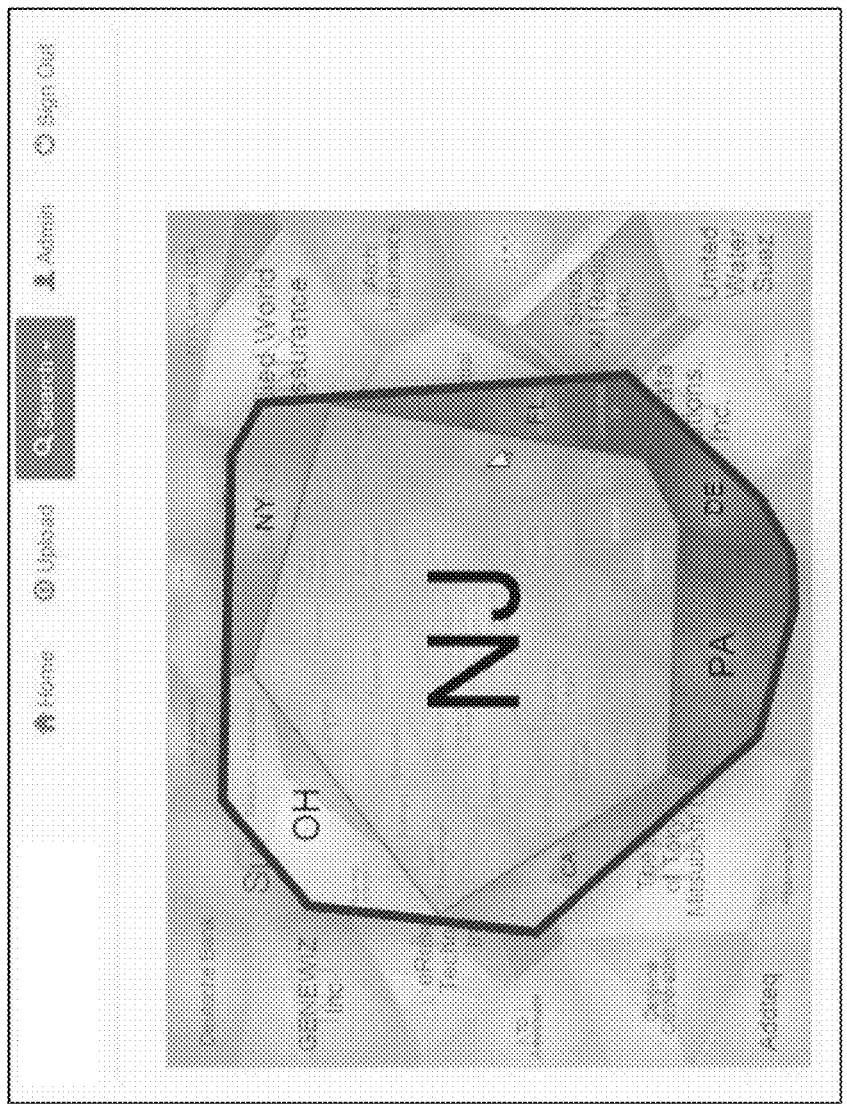
Figure 9C:

In other embodiments, the cluster chart may include multiple tiers of clusters. FIGS. 9A-9C show embodiment where the user can drill down in the cluster chart from employer (FIG. 9A) to geographic location (FIG. 9B) to job description cluster (FIG. 9C). For example, the first tier, shown in FIG. 9A may cluster job descriptions by a first parameter, such as employer. The employer clustering need not—and preferably does not—use a Vector Space Model clustering algorithm such as described in the Lingo paper. Instead the clusters are merely determined by the number of different employers having job descriptions/postings in the job descriptions database 14B, with the size of the employer clusters depending on the number of job descriptions/postings each employer has in the job descriptions database. When the user selects one of the employers, clusters according to a second parameter, such as the geographic location (e.g., states) for the job postings, for the selected first tier cluster can appear in the next tier of the cluster chart, as shown in the example of FIG. 9B. Like the employers in FIG. 9A, the job locations can appear in clusters too, as shown in FIG. 9B. Again, job location clustering need not—and preferably does not—use a Vector Space Model clustering algorithm such as described in the Lingo paper. Instead the clusters are merely determined by the values for the parameter of the second tier, e.g., job locations for the selected employer in the job descriptions database 14B, with the size of the clusters depending on the number of job descriptions/postings for each location cluster for the selected employer in the job descriptions database.

When the user selects one of the job location clusters, clusters about the job postings that the selected employer has in the selected location can appear in the next tier of the cluster chart, as shown in the example of FIG. 9C. The clusters in this chart can use a VSM clustering algorithm as in the Lingo paper to cluster the relevant job posting by prevalent phrases, or the clusters can be generated based merely on the job titles of the postings, as in the example of FIG. 9C. That is, in the illustrated example, the clusters correspond to the available positions/job postings, with the size of the cluster corresponding to the number of posting for that position. In other embodiments, other orders of hierarchies besides employer→location→position could be used, such as location→position→employer or location→employer→position, etc. Also, the hierarchies could have fewer or more tiers, such as just two tiers (e.g., location→position) or more than three tiers. The web site preferably provides a menu where the user can select to see the clusters in tiers and specify the desired tiers from a listing of available tiers.

In an example embodiment described above, the application server 22 generated the clusters, sorted the documents and generated the chart. In other embodiments, another type of programmable computer device (or network of such computer devices) can be used to generate the clusters, sort the documents, and/or generate the charts. For example, a mobile device, such as a smartphone or tablet with sufficient processing and memory capabilities could generate the clusters, sort the documents, and/or generate the chart. Also, a computer device (e.g., personal computer or laptop) with a browser using Javascript could perform one or more of these functions.

In one general aspect therefore, the present invention is directed to computer systems and computer-implemented methods for generating a cluster chart for HR-related documents. The computer system may comprise a client computer device comprising a software application (e.g., a browser or mobile app) for displaying content and a host computer data center in communication with the client computer device via an electronic data communication network (e.g., the Internet). The host computer data center comprises a database for electronically storing HR-related documents, a web server, and a programmable computer device. The web server serves web pages to the client computer device via the network that are renderable by the software application of the client computer device. The programmable computer device (e.g., the application server 22 or some other suitable computer system) is in communication with the web server and that is programmed to determine clusters of prevalent terms in a collection of HR-related documents in the database, such as resumes, job descriptions, etc. The collection of HR-related documents from which the clusters are generated is identified based on search criteria submitted from the client computer device. The clusters of prevalent terms in the collection can be determined using a clustering algorithm employing algebraic transformations of a term-document matrix generated from the collection of HR-related documents. The programmable computer device is also programmed to assign each of the HR-related documents in the collection to one or more of the determined clusters, and to generate a chart graphically showing the clusters. Each cluster in the chart has a characteristic (e.g., size) that is related to the quantity of the HR-related documents assigned to the cluster. The web server serves the chart in a cluster chart web page to the client computer device. In addition, the cluster chart web page comprises a document listing field. Further, each cluster in the cluster chart web page served to the client computer device comprises a hyperlink that when activated from the client computer device, to thereby select a cluster, causes the document listing field to list the HR-related documents assigned to the selected cluster.

In various implementations, the chart comprises a two-dimensional space, with the clusters being represented in the two-dimensional space by nonoverlapping two-dimensional polygonal shapes, and in which the area of the polygonal shapes is related to the quantity of HR-related documents assigned to the clusters represented by the respective polygonal shapes. In addition, the programmable computer device can determine the clusters by imposing both minimum and maximum limits on the quantity of HR-related documents in the collection assigned to each cluster. Further, the term-document matrix can be constructed out of terms in the collection that exceeds a predefined term frequency threshold. Still further, the programmable computer device can assign a HR-related document in the collection to one of the determined clusters when an element in a strength of membership matrix corresponding to the HR-related document and the determined cluster exceeds a predetermined assignment threshold. Also, the HR-related documents satisfying the search criteria can be ranked according to a scoring algorithm, and the collection of HR-determined used for the clustering is limited to the N highest ranked documents.

In one general aspect, a method for generating a cluster chart for HR-related documents according to the present invention may comprise the steps of (i) electronically storing HR-related documents in a computer database of a host data center and (ii) receiving, by a web server of the host data center, search criteria from a client computer device that is in communication with the host data center via an electronic data communication network. The method may also comprise the step of (iii) determining, by a programmable computer device of the host data center, clusters of prevalent terms in a collection of HR-related documents in the database, wherein the collection of HR-related documents is identified based on the search criteria received from the client computer device, and wherein the clusters of prevalent terms in the collection are determined using a clustering algorithm employing algebraic transformations of a term-document matrix generated from the collection of HR-related documents. The method further comprises the steps of (iv) assigning, by the programmable computer device, each of the HR-related documents in the collection to one or more of the determined clusters and (v) generating, by the programmable computer device, a chart graphically showing the clusters, wherein each cluster has a characteristic that is related to the quantity of the HR-related documents assigned to the cluster. The method also comprises the step of (vi) serving, by the web server, the chart in a cluster chart web page to the client computer device via the network. The cluster chart web page may comprise a document listing field, and each cluster in the cluster chart web page served to the client computer device comprises a hyperlink that when activated from the client computer device, to thereby select a cluster, causes the document listing field to list the HR-related documents assigned to the selected cluster.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. Those of ordinary skill in the art will recognize that a sufficient understanding of the present invention can be gained by the present disclosure, and therefore, a more detailed description of such elements is not provided herein.

The servers 16, 22, 24 described herein may be implemented as computer servers that execute software and/or firmware code. As such, the servers 16, 22, 24 may include one or more processors or other programmable circuits to execute the software and firmware code. The software may use any suitable computer software language type, using, for example, conventional or object-oriented techniques. Such software may be stored on any type of suitable computer-readable medium or media of the computing devices, such as, for example, primary or secondary computer memory. The primary memory can include main memory (such as RAM and ROM), processor registers and processor cache. The secondary memory can include magnetic or optical storage systems, or flash memory, for example, such as HDDs and/or SSDs.

The various databases described herein may be implemented may be embodied as solid state memory (e.g., ROM), hard disk drive systems (HDDs), solid state drives (SSDs), RAID, disk arrays, storage area networks (SANs), in-memory database systems, and/or any other suitable system for storing computer data. In addition, the databases may comprise caches, including web caches and database caches. The databases may be part of the servers 16, 22, 24 or connected to the servers 16, 22, 24 via a network connection of the data center 18. The networks may comprise one or more LANs, WANs, the Internet, and/or an extranet, or any other suitable data communication network allowing communication between computer systems. The networks may comprise wired and/or wireless links.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment. Further, while various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system for generating a cluster chart for HR-related documents, the computer system comprising:
   a client computer device comprising a software application for displaying content; and
   a host computer data center in communication with the client computer device via an electronic data communication network, wherein the host computer data center comprises:
   a database for electronically storing HR-related documents that comprise at least one of resumes and job descriptions;
   a web server that serves web pages to the client computer device via the network that are renderable by the software application of the client computer device, and wherein the web server receives requests from the software application of the client computer device for web pages via the network; and
   a programmable computer device that is in communication with the web server and that is programmed to:
   determine clusters of concepts in a collection of HR-related documents in the database, wherein the collection of HR-related documents is identified based on search criteria submitted from the client computer device, and wherein the clusters of concepts in the collection are determined by:
   determining whether terms appearing in the collection of HR-related documents are candidates for cluster labels based on, in part, a frequency of occurrence of the terms in the collection of HR-related documents, wherein the terms comprise at least one of single terms and phrases;
   identifying distinct concepts in the collection of HR-related documents through cluster-label induction that includes:
   applying Singular Value Decomposition (SVD) to a term document matrix constructed from high-frequency terms to determine an orthogonal basis of the term-document matrix, wherein the high-frequency terms are terms that exceed a threshold occurrence frequency in the collection of HR-related documents;
   selecting a first set of k vectors of the orthogonal basis, which represent k concepts in the collection of HR-related documents, to be the cluster candidates; and
   calculating distances between the high-frequency terms in the collection of HR-related documents to the k concepts to determine labels for the cluster candidates;
   assign each of the HR-related documents in the collection to one or more of the determined clusters using a Vector Space Model sorting algorithm; and
   generate a chart graphically showing the clusters, wherein the determined labels for clusters is shown in the chart and each cluster has a characteristic that is related to the quantity of the HR-related documents assigned to the cluster; and
   the web server serves the chart in a cluster chart web page to the client computer device, wherein:
   the cluster chart web page comprises a document listing field; and
   each cluster in the cluster chart web page served to the client computer device comprises a hyperlink that when activated from the client computer device, to thereby select a cluster, causes the document listing field to list the HR-related documents assigned to the selected cluster.

2. The computer system of claim 1, wherein:
   the chart comprises a two-dimensional space;
   the clusters are represented in the two-dimensional space by nonoverlapping two-dimensional polygonal shapes; and
   the area of the polygonal shapes is related to the quantity of HR-related documents assigned to the clusters represented by the respective polygonal shapes.

3. The computer system of claim 1, wherein the programmable computer device is programmed to determine the clusters by imposing both minimum and maximum limits on the quantity of HR-related documents in the collection assigned to each cluster.

4. The computer system of claim 1, wherein HR-related documents satisfying the search criteria are ranked according to a scoring algorithm, and the collection of HR-determined is limited to the N highest ranked documents.

5. The computer system of claim 1, wherein the programmable computer device comprises an application server.

6. The computer system of claim 1, wherein the software application comprised by the client computer device is a web browser.

7. The computer system of claim 1, wherein the client computer device comprises a mobile computer device and the software application comprises a mobile app.

8. The computer system of claim 1, wherein:
the chart comprises at least first and second tiers of clusters;
the first tier of clusters is generated by sorting the HR-related documents according to a parameter of the HR-related documents;
the second tier of clusters is generated with the clustering algorithm; and
the second tier of clusters is displayed when the user selects one of the clusters in the first tier, such that the second tier of clusters are clusters of HR-related documents having a value of the parameter associated with the first tier cluster that the user selected.

9. A computer-implemented method for generating a cluster chart for HR-related documents, the method comprising:
electronically storing HR-related documents in a computer database of a host data center, wherein the HR-related documents comprise at least one of resumes and job descriptions;
receiving, by a web server of the host data center, search criteria from a client computer device that is in communication with the host data center via an electronic data communication network;
determining, by a programmable computer device of the host data center, clusters of concepts in a collection of HR-related documents in the database, wherein the collection of HR-related documents is identified based on the search criteria received from the client computer device, and wherein the clusters of concepts in the collection are determined by:
determining whether terms appearing in the collection of HR-related documents are candidates for cluster labels based on, in part, a frequency of occurrence of the terms in the collection of HR-related documents, wherein the terms comprise at least one of single terms and phrases;
identifying distinct concepts in the collection of HR-related documents through cluster-label induction that includes:
applying Singular Value Decomposition (SVD) to a term-document matrix constructed from high-frequency terms to determine an orthogonal basis of the term-document matrix, wherein the high-frequency terms are terms that exceed a threshold occurrence frequency in the collection of HR-related documents;
selecting a first set of k vectors of the orthogonal basis, which represent k concepts in the collection of HR-related documents, to be the cluster candidates; and
calculating distances between the high-frequency terms in the collection of HR-related documents to the k concepts to determine labels for the cluster candidates;
assigning, by the programmable computer device, each of the HR-related documents in the collection to one or more of the determined clusters using a Vector Space Model sorting algorithm;
generating, by the programmable computer device, a chart graphically showing the clusters, wherein the determined labels for clusters is shown in the chart and each cluster has a characteristic that is related to the quantity of the HR-related documents assigned to the cluster; and
serving, by the web server, the chart in a cluster chart web page to the client computer device via the network, wherein:
the cluster chart web page comprises a document listing field; and
each cluster in the cluster chart web page served to the client computer device comprises a hyperlink that when activated from the client computer device, to thereby select a cluster, causes the document listing field to list the HR-related documents assigned to the selected cluster.

10. The computer-implemented method of claim 9, wherein:
the chart comprises a two-dimensional space;
the clusters are represented in the two-dimensional space by nonoverlapping two-dimensional polygonal shapes; and
the area of the polygonal shapes is related to the quantity of HR-related documents assigned to the clusters represented by the respective polygonal shapes.

11. The computer-implemented method of claim 9, wherein determining the clusters comprises imposing both minimum and maximum limits on the quantity of HR-related documents in the collection assigned to each cluster.

12. The computer-implemented method of claim 9, further comprising ranking the HR-related documents satisfying the search criteria according to a scoring algorithm, and the collection of HR-related documents used to determine the clusters is limited to the N highest ranked documents.

13. The computer system of claim 9, wherein:
the chart comprises at least first and second tiers of clusters; and
the method further comprises:
generating the first tier of clusters by sorting the HR-related documents according to a parameter of the HR-related documents;
generating the second tier of clusters with the clustering algorithm; and
displaying the second tier of clusters when the user selects one of the clusters in the first tier, such that the second tier of clusters are clusters of HR-related documents having a value of the parameter associated with the first tier cluster that the user selected.

14. The computer system of claim 1, wherein, in response to the web server receiving an input from an end-user selecting multiple clusters in the chart conjunctively, the web server updates the cluster chart web page so that the document listing field lists the HR-related documents assigned to each of the multiple selected clusters.

15. The computer-implemented method of claim 9, further comprising:
updating the cluster chart web page in response to the web server receiving an input from an end-user selecting multiple clusters in the chart disjunctively, so that the document listing field lists the HR-related documents assigned to any of the multiple selected clusters.

* * * * *